United States Patent Office 3,507,689
Patented Apr. 21, 1970

3,507,689
PROCESS FOR INCREASING THE BOND STRENGTH BETWEEN RUBBER AND TEXTILES
Helmut Freytag, Cologne-Stammheim, Ivo Dane and Erwin Müller, Leverkusen, and Guido Fromandi, Schildgen, Germany, assignors to Farbenfabriken Bayer Aktiengesellschaft, Leverkusen, Germany, a corporation of Germany
No Drawing. Filed June 29, 1966, Ser. No. 561,383
Claims priority, application Germany, July 1, 1965, F 46,485
Int. Cl. B29h 9/06
U.S. Cl. 117—138.8                5 Claims

ABSTRACT OF THE DISCLOSURE

Increasing the bond strength between rubber and a textile material by vulcanizing an applied mixture of (1) tetramethylol-hydrazodicarbonamide or an ether or ester thereof, (2) a benzene derivative selected from the group consisting of resorcinol, m-aminophenol, an ether or an ester or a condensate thereof with a ketone or an aldehyde, m-phenylene diamine and 1,5-dihydroxy-naphthalene and (3) natural rubber or synthetic rubber.

---

This invention relates to rubber and textile bonding, and is concerned with a process for increasing the bond strength between rubber and textiles.

Textiles are worked into a large number of rubber products, for example car tyres, conveyor belts, hoses and the like in order to strengthen or to reinforce them. One important requirement in cases such as these is that there should be a firm bond between the rubber and the fabric— a requirement which, unless special measures are taken, cannot be satisfied, particularly with the increasing popularity of semi- and fully synthetic fabrics.

To obtain a bond of adequate strength between rubber and textiles, the textiles have until now usually been provided with pre-impregnations. Nowadays, such pre-impregnations are generally based on latices of elastomers and resorcinol-formaldehyde resins dissolved or dispersed in water. Normally, the resorcinol-formaldehyde resins are not fully condensed, being further condensed as processing continues by the addition of formaldehyde. In many cases, however, the bond strength obtained by such impregnations is inadequate.

We have found that the bond strength between rubber and textiles can be increased very substantially by adding, on the one hand, tetramethylol-hydrazodicarbonamide, its ethers or esters and, on the other hand, benzene derivatives which, in the m-position, contain optionally etherified or esterified hydroxyl groups and/or amino groups or their condensates with ketones or aldehydes or, instead of the benzene derivatives, 1,5-dihydroxynaphthalene, to the vulcanisable mixture based on natural or synthetic rubber which is applied to the textile material. The bond or adhesion of the rubber both to pre-impregnated and to non-pre-impregnated textiles is improved by additives such as these. Among the non-impregnated fibrous materials, a particularly marked effect is obtained in the case of polyamide materials.

Resorcinol is preferably used as the benzene derivative. Other m-substituted benzene derivatives used in accordance with the invention are m-aminophenol, m-phenylene diamine, resorcinol diacetate or propionate or butyrate, or resorcinol monomethylether or propyl ether. Examples of condensation products with carbonyl compounds are incompletely condensed resins of resorcinol with formaldehyde in a molar ratio of approximately 1:0.5 to 0.9, condensates of resorcinol with acetaldehyde in a molar ratio of approximately 1:0.5 to 1, and condensates of resorcinol with acetone in a molar ratio of about 1:0.5 to 2.

The tetramethylol-hydrazodicarbonamide obtained by reacting hydrazodicarbonamide with 4 mols of formaldehyde (cf. Houben-Weyl, Methoden der organ. Chemie, vol. 14/2, pp. 352), is preferably used in crystallised form. Instead of the pure compound (M.P. 149° C.), it is also possible to use resin-like condensation products which contain formaldehyde to a greater or a lesser extent.

As already mentioned, methylethers or esters which can be regarded as masked methylol compounds may also be used for the process according to the invention. They are distinguished from the free methylol compounds by inter alia their lower melting points and hence the fact that they are easier to disperse in the rubber mixture.

The tetramethylol compound according to the invention or its derivatives are mixed into the rubber mixture to be applied to the textiles in quantities of, for example, 0.2% to 8% by weight, preferably 0.5% to 4% by weight( based on the rubber). The adhesion-promoting effect is improved very considerably by the addition of resorcinol or other m-substituted benzene derivatives in approximately equivalent quantities, but preferably in quantities of between half and twice as large. When the resorcinol is mixed in, the temperature of the mixture should be above the melting point of resorcinol (above approximately 115° C.). Even in cases where the other benzene derivatives mentioned above are used, it is of advantage to keep the temperature of the rubber mixture above the melting point of these substances during their addition.

Suitable types of rubber for the mixture are both natural rubber and synthetic rubbers such as copolymers of butadiene-styrene, butadiene-acrylonitrile, isobutyleneisoprene and ethylene-propylene (usually with a third component), as well as polyisoprene, polybutadiene, polychlorobutadiene and others as well as their blends.

Suitable textiles are filaments (cord filaments in particular) and fabrics woven or knitted from all kinds of fibres such as rayon, polyamides, polyesters, polyacrylonitrile, cotton and others.

The adhesion-promoting pre-impregnation of the textiles may be carried out in one of the impregnating baths commonly used in the art containing, for example, latices based on natural rubber, butadiene-styrene, butadiene-acrylonitrile, chlorobutadiene, butadiene-styrene-vinyl pyridine polymers and their blends and, preferably, resorcinol-formaldehyde resins.

The textiles are coated with the rubber mixture according to the invention by the processes normally used in the rubber industry. The end products are also vulcanised in the usual way.

Example 1

Two tire-carcass mixtures of the following compositions were prepared on a set of mixing rolls:

|  | A | B |
|---|---|---|
|  | (parts by weight) | (parts by weight) |
| Natural rubber | 100 | 100 |
| Semi-active lampblack | 20 | 20 |
| Resorcinol |  | 1.3 |
| Zinc oxide | 5 | 5 |
| Pinewood oil | 2 | 2 |
| Aromatic mineral oil | 4 | 4 |
| Phenyl-α-naphthylamine | 1.5 | 1.5 |
| Sulphur | 2.3 | 2 |
| Benzothiazyl-2-cyclohexyl-sulphenamide | 0.7 | 0.7 |
| Diphenyl guanidine | 0.1 | 0.1 |
| Tetramethylol-hydrzaodicarbonamide |  | 1.0 |

In the case of mixture B, a master batch of rubber, carbon black and resorcinol was initially prepared at a mixing temperature of 130° C. After this master batch had been cooled to approximately 100° C., the remaining components were added, followed ultimately by the addition of the tetramethylol - hydrazodicarbonamide which had been dispersed beforehand in aromatic mineral oil (ratio 1:1) in a ball mill. Mixture A was similarly prepared, except that neither resorcinol nor tetramethylol-hydrazodicarbonamide was added.

Rayon cord filaments (Td. 1650/1 x 2) were incorporated during vulcanisation between pairs of 40-cm. long, 3-mm. thick and 2-cm. wide strips prepared from the aforementioned mixtures perpendicularly to the strips and at intervals of 1.5 cm. The filaments had been impregnated beforehand with an impregnating mixture of the following composition:

| | Parts by weight |
|---|---|
| Natural rubber latex (60%) | 125 |
| Latex of a copolymer of butadiene, styrene and vinyl pyridine (40%) | 62.5 |
| Pre-condensed resorcinol-formaldehyde resin | 20 |
| 30% formaldehyde solution | 20 |
| Water | 1872.5 |
| | 2100.0 |

Overall dry content=6%.

The filaments were heated for 10 minutes to 135° C. during the drying process. The test specimens containing the filaments were vulcanised for 50 minutes at 138° C.

In order to determine the static bond strength, individual test specimens 1.5 cm. long were punched out of the test strips in such a way that there was one cord filament in the middle of each (length embedded=2 cm.). After preheating to 80° C., the force required to rip the filament out of the rubber was measured in a chamber heated to 80° C.

Dynamic bond strength was determined by clamping the test strip described above in the movable part of a testing machine, and heating it to 80° C. The projecting ends of the cord filaments were anchored or fixed to the stationary part of the machine. The rubber was then reciprocated 500 times per minute over a total length of 2.5 mm. (±1.25 mm.). The time which passed before the cord filament was detached from the rubber under this strain was then measured.

Both the bond-strength testing methods are described at length in Bayer Mitteilungen für die Gummi-Industrie, No. 29, pp. 71 to 78, published by Farbenfabriken Bayer AG.

The following bond strengths were obtained:

| Impregnated rayon cord: | Mixture A | Mixture B |
|---|---|---|
| Static bond strength at 80° C., kg | 9.5 | 12.6 |
| Dynamic bond strength at 80° C., minutes | 172 | 204 |

Example 2

Tests similar to those described in Example 1, were conducted with non-impregnated nylon cord filaments (Td. 840/1 x 2). Mixture A was again used. Mixture B was replaced by a mixture C which only differed from mixture B in that the quantity of resorcinol had been increased to 2.5 parts by weight and the quantity of tetramethylol-hydrazodicarbonamide to 2 parts by weight. The following bond strengths were obtained:

| Non-impregnated nylon cord | Mixture A[1] | Mixture C[2] |
|---|---|---|
| Static bond strength at 80° C., kg | 2.3 | 6.2 |
| Dynamic bond strength at 80° C., minutes | 20 | 120 |

[1] No additives.
[2] With 2.5% resorcinol and 2% of tetramethylol-hydrazodicarbonamide.

Example 3

The following two rubber mixtures intended for industrial application were prepared on mixing rolls:

| | Mixture D (parts by wt.) | Mixture E (parts by wt.) |
|---|---|---|
| Natural rubber | 50 | 50 |
| Styrene-butadiene rubber | 50 | 50 |
| HAF-carbon black | 20 | 20 |
| MT-carbon black | 45 | 45 |
| Resorcinol | | 2.5 |
| Zinc oxide | 5 | 5 |
| Stearic acid | 1 | 1 |
| Factice | 10 | 10 |
| Aromatic mineral oil | 3 | 3 |
| Styrenised diphenylamine | 1.5 | 1.5 |
| Benzenethiazyl-2-cyclohexyl-sulphenamide | 1.8 | 1.8 |
| Condensation product of acrolein with aromatic bases | 1.0 | 1.0 |
| Sulphur | 2.0 | 2.0 |
| Tetramethylol-hydrazodicarbonamide | | 2.0 |

In the case of mixture E, a master batch was again prepared from rubber, carbon black and resorcinol at a mixing temperature of 130° C. After this master batch had been cooled to approximately 100° C., the remaining components of the mixture were added, followed ultimately by the addition of the tetramethylol-hydrazodicarbonamide which had been dispersed beforehand in aromatic mineral oil (1:1) in a ball mill. Mixture D was similarly prepared, except that neither resorcinol nor tetramethylolhydrazo-dicarbonamide was added.

Approximately 1 mm.-thick sheets prepared from these mixtures were placed between two pieces of a non-pretreated leno or gauze cloth of nylon yarn (25 warp filaments Td. 840 per cm., 12 weft filaments Td. 840 per cm.) weighing 440 g. per square metre, and then vulcanised in a press at a pressure of 20 kg./cm.$^2$. Strips 2.5 cm. wide were then punched out of the panels thus obtained. The force required to separate the strips of fabric from the rubber was measured at room temperature on a tensile elongation testing machine with inertial-free indication. The test results were then evaluated with reference to a stress-strain diagram, the means value being determined in each case from the 10 maximum values of one diagram. The test data set out in the following were each obtained from 5 test strips: Bond strengths of non-impregnated nylon fabric:

Mixture D (no additives)—0.9 kg./2.5 cm.
Mixture E (containing 2.5% of resorcinol and 2% of tetramethylol-hydrazo-dicarbonamide)—7.2 kg./2.5 cm.

Example 4

The following mixtures were prepared on a set of mixing rolls:

| | Mixture F (parts by wt.) | Mixture G (parts by wt.) |
|---|---|---|
| Styrene butadiene rubber | 100.0 | 100.0 |
| HAF-carbon black | 20.0 | 20.0 |
| SAF-carbon black | 15.0 | 15.0 |
| m-Phenylene diamine | | 1.25 |
| Aromatic mineral oil | 8.0 | 8.0 |
| Stearic acid | 1.5 | 1.5 |
| Phenyl-α-naphthylamine | 1.5 | 1.5 |
| Zinc oxide | 5.0 | 5.0 |
| Benzothiazyl-2-cyclohexyl-sulphenamide | 1.25 | 1.25 |
| Thiuram-monosulphide | 0.15 | 0.15 |
| Sulphur | 1.8 | 1.8 |
| Tetramethylol-hydrazo-dicarbonamide-tetramethylether | | 1.25 |

The tetramethylol-hydrazodicarbonamide-tetramethylolether was the last component to be added after the mixture had been cooled to approximately 90° C.

As in Example 1, rayon cord filaments impregnated as described in that example were incorporated into these mixtures during vulcanisation. Further testing was also as described in Example 1.

The following bond strengths were obtained:

Impregnated rayon cord

Static bond strength at 80° C.;
  Mixture F—8.1 kg.
  Mixture G—10.6 kg.

Example 5

The following mixtures were prepared on mixing rolls:

|  | Mixture H (parts by wt.) | Mixture I (parts by wt.) |
|---|---|---|
| Butadiene-acrylonitrile rubber | 100.0 | 100.0 |
| SRF-carbon black | 30.0 | 30.0 |
| FEF-carbon black | 20.0 | 20.0 |
| m-Aminophenol |  | 2.5 |
| Zinc oxide | 5.0 | 5.0 |
| Coumarone resin | 5.0 | 5.0 |
| Xylene-formaldehyde resin | 10.0 | 10.0 |
| Stearic acid | 2.5 | 2.5 |
| N-phenyl-N¹-cyclohexyl-p-phenylene diamine | 0.8 | 0.8 |
| Phenyl-α-naphthylamine | 0.8 | 0.8 |
| Sulphur | 2.0 | 2.0 |
| N-diethyl-2-benzothiazyl-sulphenamide | 1.5 | 1.5 |
| Tetramethylol-hydrazo-dicarbon-amide tetra-acetate |  | 3.2 |

As in Examples 1 and 2, impregnated rayon cord filaments on the one hand and non-impregnated nylon cord filaments on the other hand were incorporated during vulcaisation. The only difference between the impregnating liquid used here and that used according to Example 1 was that the two latices of that impregnating liquid were now replaced by butadiene-acrylonitrile latex.

Testing as in Example 1 revealed the following results:

| Impregnated rayon cord | Mixture H | Mixture I |
|---|---|---|
| Static bond strength at 80° C., kg | 8.5 | 11.5 |
| Non-impregnated rayon cord; |  |  |
| Static bond strength at 80° C., kg | 3.0 | 6.1 |

Example 6

Tests were carried out as in Example 1, except that, in this case, non-impregnated rayon cord filaments were used. In addition to mixture A (no further additives), a mixture K was used as control. The only difference between this mixture K and the mixture B was that, instead of 1.3 parts of resorcinol, it contained 4.4 parts of weight of resorcinol diacetate and, instead of 1.0 part by weight of tetramethylol-hydrazodicarbonamide, 2.0 parts by weight of this substance.

Testing carried out in accordance with Example 1 revealed the following bond strengths:

| Non-impregnated rayon cord | Mixture A | Mixture K |
|---|---|---|
| Static bond strength at 80° C., killograms | 2.1 | 8.5 |
| Dynamic bond strength at 80° C., minutes | 2.1 | 120 |

What we claim is:

1. A process which comprises applying to a textile material selected from the group consisting of rayon, polyamides, polyesters, polyacrylonitrile, and cotton a mixture of (1) tetramethylol-hydrazodicarbonamide or an ether or ester thereof, (2) a benzene derivative selected from the group consisting of resorcinol, m-aminophenol, an ether or an ester or a condensate thereof with a ketone or an aldehyde, m-phenylene diamine and 1,5-dihydroxynaphthalene and (3) natural rubber or synthetic rubber, and vulcanizing said mixture.

2. A process as claimed in claim 1, wherein the benzene derivative is resorcinol.

3. A process as claimed in claim 1 wherein the rubber mixture contains tetramethylol-hydrazo-dicarbonamide.

4. A process as claimed in claim 1 wherein the rubber mixture contains tetramethylol - hydrazodicarbonamide tetramethyl ether.

5. The product of the process of claim 1.

References Cited

UNITED STATES PATENTS

| 2,975,095 | 3/1961 | Bletso | 161—244 |
| 3,097,109 | 7/1963 | Danielson | 117—162 |
| 3,097,111 | 7/1963 | Danielson | 117—162 |
| 3,158,521 | 11/1964 | Goecke | 156—310 |

JOHN T. GOOLKASIAN, Primary Examiner

W. E. HOAG, Assistant Examiner

U.S. Cl. X.R.

117—143, 146, 161, 162; 156—110; 260—3, 852, 854, 838, 845, 848

PO-1050
(5/69)

UNITED STATES PATENT OFFICE
CERTIFICATE OF CORRECTION

Patent No. 3,507,689      Dated April 21, 1970

Inventor(s) Helmut Freytag, Ivo Dane and Erwin Müller

It is certified that error appears in the above-identified patent and that said Letters Patent are hereby corrected as shown below:

Col. 6, line 10, "2.1" should read -- 10 --.

SIGNED AND SEALED

NOV. 17, 1970

(SEAL)
Attest:

Edward M. Fletcher, Jr.
Attesting Officer

WILLIAM E. SCHUYLER, JR.
Commissioner of Patents